United States Patent
Dumba et al.

(10) Patent No.: US 11,954,524 B2
(45) Date of Patent: Apr. 9, 2024

(54) COMPLIANCE AWARE APPLICATION SCHEDULING

(71) Applicant: INTERNATIONAL BUSINESS MACHINES CORPORATION, Armonk, NY (US)

(72) Inventors: Braulio Gabriel Dumba, White Plains, NY (US); Jun Duan, Mount Kisco, NY (US); Nerla Jean-Louis, Urbana, IL (US); Muhammed Fatih Bulut, West Greenwich, RI (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 17/330,583

(22) Filed: May 26, 2021

(65) Prior Publication Data
US 2022/0382583 A1   Dec. 1, 2022

(51) Int. Cl.
G06F 9/46 (2006.01)
G06F 9/48 (2006.01)
G06F 9/50 (2006.01)

(52) U.S. Cl.
CPC .......... *G06F 9/4881* (2013.01); *G06F 9/5005* (2013.01); *G06F 2209/5011* (2013.01); *G06F 2209/503* (2013.01)

(58) Field of Classification Search
CPC ................. G06F 9/4881; G06F 9/5005; G06F 2209/5011; G06F 2209/503
See application file for complete search history.

(56) References Cited

U.S. PATENT DOCUMENTS 7,996,842 B2   8/2011   Savit
8,516,575 B2   8/2013   Burnside
(Continued)

FOREIGN PATENT DOCUMENTS

CN   102958166 A   *   3/2013   .......... G06F 9/5005
CN   107196803 B      11/2019
(Continued)

OTHER PUBLICATIONS

"GitHub—IBM/kube-safe-scheduler", Dec. 5, 2019, 7 pages, <https://github.com/IBM/kube-safe-scheduler>.
(Continued)

*Primary Examiner* — Diem K Cao
(74) *Attorney, Agent, or Firm* — Stephen R. Yoder

(57) ABSTRACT

A method for scheduling services in a computing environment includes receiving a service scheduling request corresponding to the computing environment and identifying a resource pool and a set of compliance requirements corresponding to the computing environment. The method continues by identifying target resources within the resource pool, wherein target resources are resources which meet the set of compliance requirements, and subsequently identifying a set of available target resources, wherein available target resources are target resources with scheduling availability. The method further includes analyzing the set of available target resources to determine a risk score for each available target resource and selecting one or more of the set of available target resources according to the determined risk scores. The method continues by scheduling a service corresponding to the service scheduling request on the selected one or more available target resources.

20 Claims, 6 Drawing Sheets

(56) References Cited

U.S. PATENT DOCUMENTS

| | | | |
|---|---|---|---|
| 9,967,159 B2 | 5/2018 | Shroff | |
| 10,558,503 B2 | 2/2020 | Deivanayagam | |
| 10,713,664 B1 | 7/2020 | Alagappan | |
| 10,721,275 B2 | 7/2020 | Kung | |
| 10,824,528 B2* | 11/2020 | Gudka | H04L 43/50 |
| 10,929,797 B1 | 2/2021 | Gupta | |
| 2018/0004569 A1 | 1/2018 | Nasser | |
| 2018/0373558 A1 | 12/2018 | Chang | |
| 2019/0121671 A1* | 4/2019 | Guim Bernat | G06F 9/3017 |
| 2019/0220319 A1 | 7/2019 | Parees | |
| 2019/0227835 A1* | 7/2019 | Sivasubramanian | G06F 11/3433 |
| 2020/0334078 A1* | 10/2020 | Baldocchi | G06F 9/48 |
| 2021/0081561 A1 | 3/2021 | Blandin | |
| 2021/0279162 A1* | 9/2021 | Ali | G06F 11/2025 |

FOREIGN PATENT DOCUMENTS

| | | |
|---|---|---|
| CN | 111858054 A | 10/2020 |
| WO | 2016137397 A2 | 9/2016 |

OTHER PUBLICATIONS

"GitHub—kubernetes-sigs/kube-batch: A batch scheduler of kubernetes for high performance workload, e.g. AI/ML, BigData, HPC", Accessed on Dec. 14, 2020, 3 pages, <https://github.com/kubernetes-sigs/kube-batch>.

Abbes et al., "A New Placement Optimization Approach in Hybrid Cloud Based on Genetic Algorithm", 2016 IEEE International Conference on e-Business Engineering, IEEE computer society, 6 pages.

Bittencourt et al., "Scheduling in Hybrid Clouds", Cloud Computing: Networking and Communications Challenges, IEEE Communications Magazine, Sep. 2012, 6 pages.

Mell et al., "The NIST Definition of Cloud Computing", NIST, National Institute of Standards and Technology, Special Publication 800-145, Sep. 2011, 7 pages.

International Searching Authority Patent Cooperation Treaty PCT, Notification of Transmittal of the International Search Report and the Written Opinion of the International Searching Authority ,or the Declaration, dated Jul. 27, 2022 (Jul. 27, 2022), International application No. PCT/CN2022/089133, 9 pages.

* cited by examiner

COMPLIANCE AWARE APPLICATION SCHEDULING

BACKGROUND

The present invention relates generally to the field of application scheduling, and more specifically, to compliance awareness for hybrid cloud applications.

Many companies have resources (e.g., bare metal, virtual machines, containers) and services spanning across multiple cloud infrastructures and platforms. Implementation in this manner is typically referred to as hybrid cloud. Generally, hybrid cloud refers to IT infrastructure that connects at least one public cloud and at least one private cloud, and provides orchestration, management, and application portability between said at least one public cloud and said at least one private cloud to create a single, flexible cloud environment for running a company's computing workloads.

SUMMARY

A method for scheduling services in a computing environment includes receiving a service scheduling request corresponding to the computing environment and identifying a resource pool and a set of compliance requirements corresponding to the computing environment. The method continues by identifying target resources within the resource pool, wherein target resources are resources which meet the set of compliance requirements, and subsequently identifying a set of available target resources, wherein available target resources are target resources with scheduling availability. The method further includes analyzing the set of available target resources to determine a risk score for each available target resource and selecting one or more of the set of available target resources according to the determined risk scores. The method continues by scheduling a service corresponding to the service scheduling request on the selected one or more available target resources.

DETAILED DESCRIPTION

Figure 1:
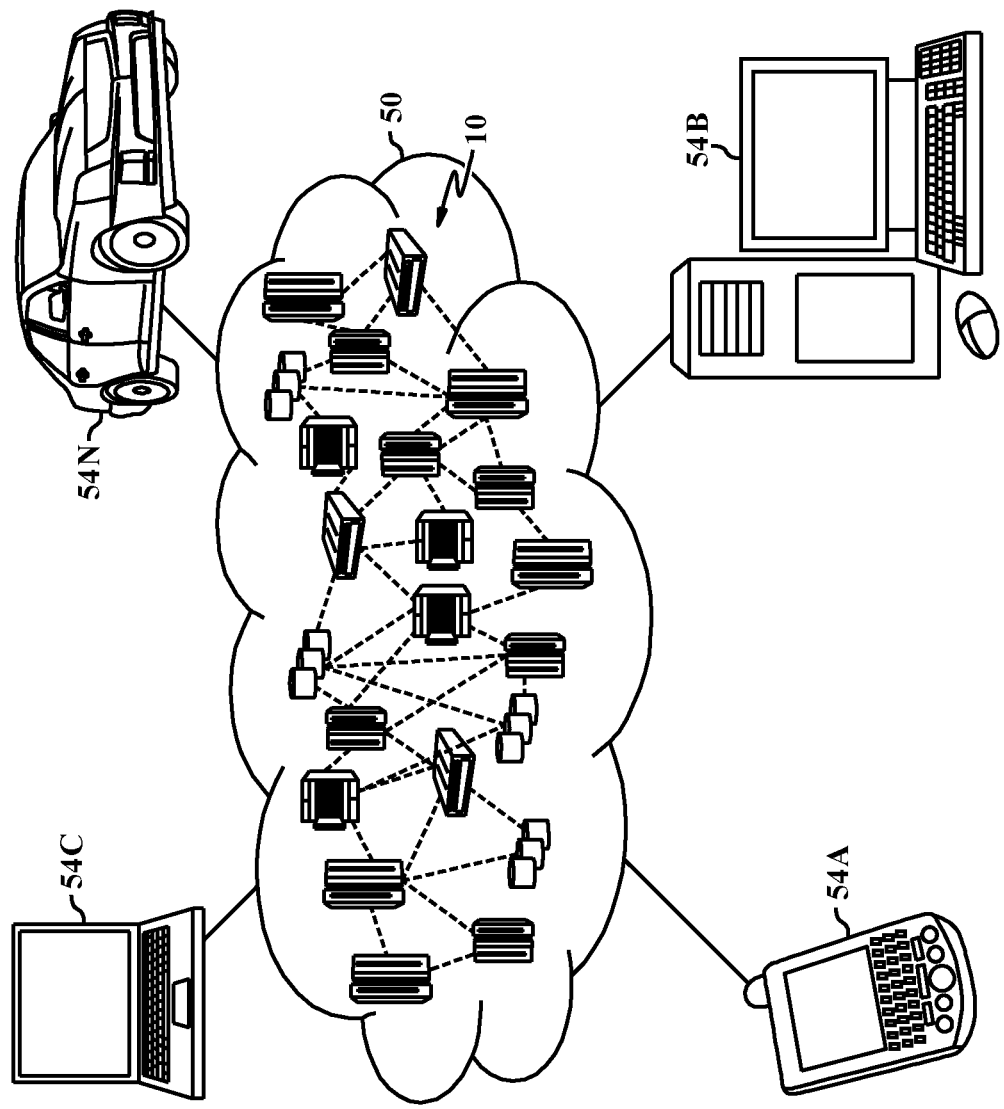
FIG. 1 depicts a cloud computing environment according to an embodiment of the present invention.

Ease of deployment and management of workloads deployed in hybrid cloud environments for security reasons and business needs continue to be of increasing importance. Notably, there is a growing need to ensure that regulations and security standard requirements are met with respect to these workloads without committing additional time and capital that companies can ill afford. The heterogeneous market of cloud offerings today has motivated the increasing popularity of both hybrid cloud and multi-cloud models. With respect to any cloud environment, the security posture of said environment can be constantly changing based on various vulnerabilities and configuration issues, such as those raised by health check operations, etc. . . . Increasing adoption of DevOps and Agile software development methodologies require dynamic decision making based on changing conditions. The above-cited conditions motivate the need for a compliance-aware application scheduler that operates on Platform as a Service cloud environments (such as K8s) to ensure that the compliance requirements are met initially and as the services continue to run. The present invention enables ongoing compliance-aware scheduling as described.

The present invention will now be described in detail with reference to the Figures. Implementation of embodiments of the invention may take a variety of forms, and exemplary implementation details are discussed subsequently with reference to the Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
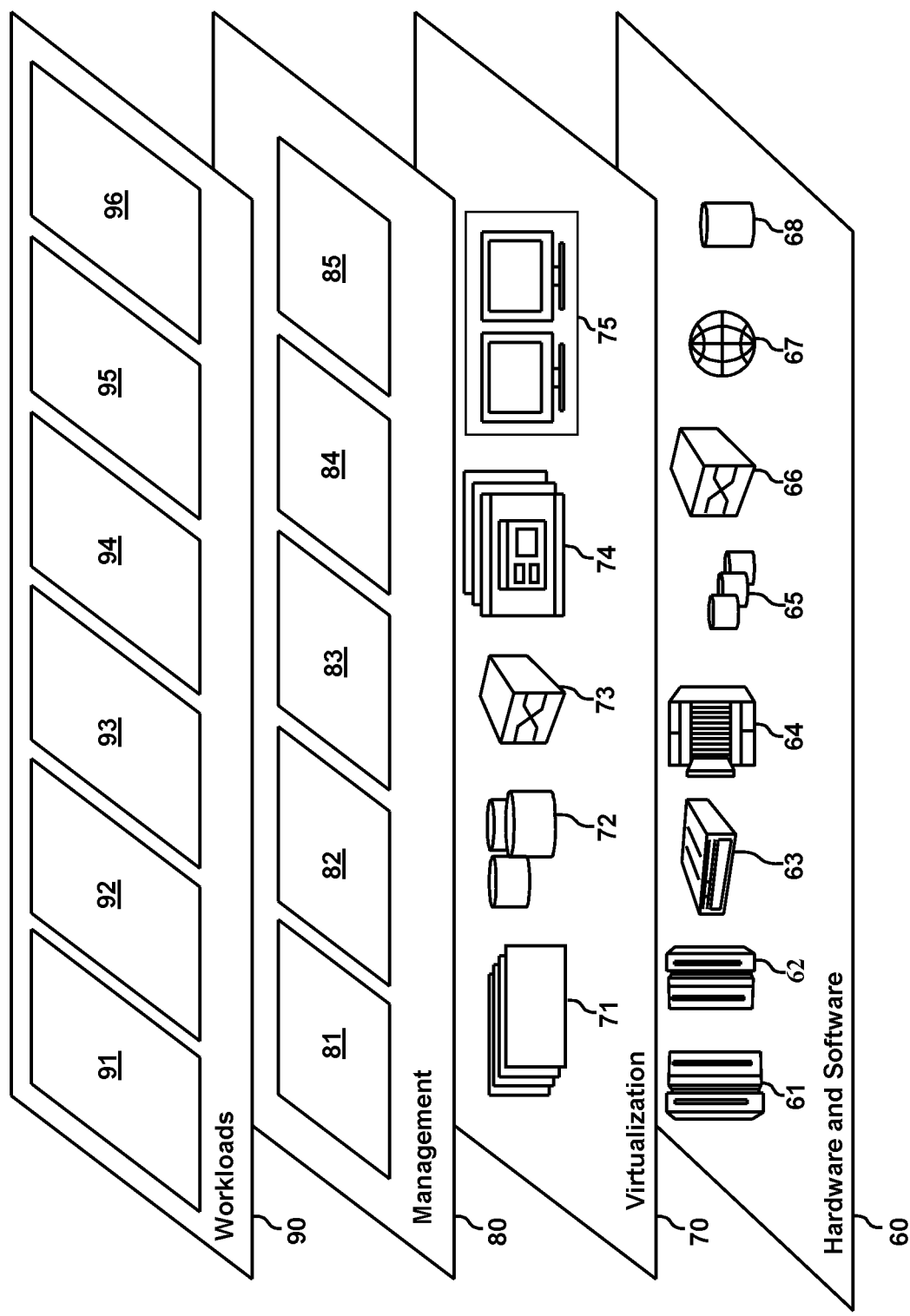
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and scheduling 96.

Figure 3:
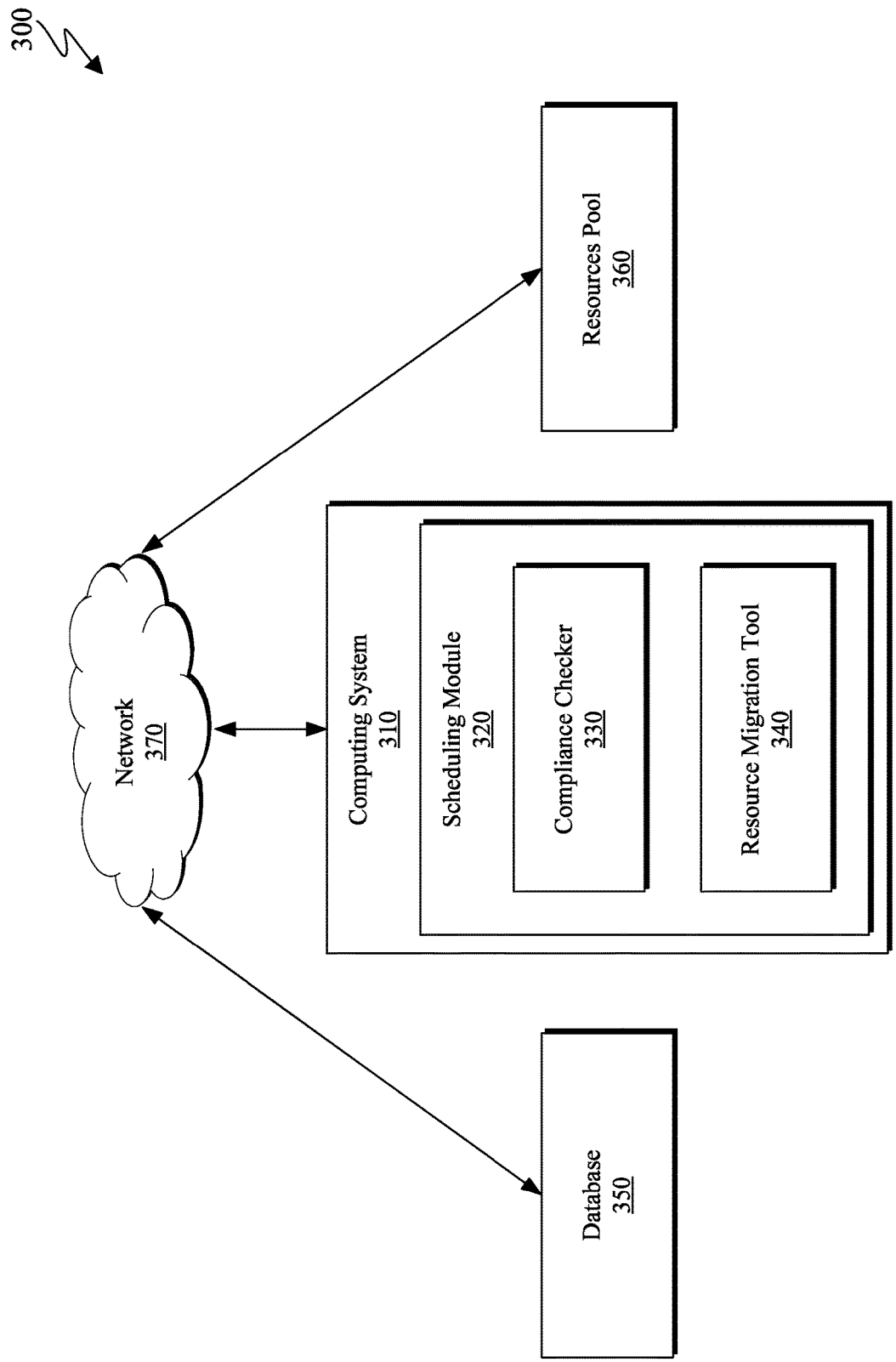
FIG. 3 is a block diagram depicting a scheduling system in accordance with at least one embodiment of the present invention.

FIG. 3 is a block diagram depicting a scheduling system 300 in accordance with at least one embodiment of the present invention. As depicted, scheduling system 300 includes computing system 310, database 350, and resources pool 360. Scheduling system 300 may enable security compliance and awareness when scheduling various application operations within a cloud environment. It should be appreciated that scheduling system 300 may be implemented in any number of cloud environments, including, but not limited to, hybrid cloud and multi cloud platforms. It should therefore be appreciated that the depicted embodiment of scheduling system 300 and the corresponding structure with which the various applications are depicted relative to one another are not intended to be limiting, but rather provide just one example of a system capable of executing the methods disclosed herein.

Computing system 310 can be a desktop computer, a laptop computer, a specialized computer server, or any other computer system known in the art. In some embodiments, computing system 310 represents computer systems utilizing clustered computers to act as a single pool of seamless resources. In general, computing system 310 is representative of any electronic device, or combination of electronic devices, capable of receiving and transmitting data, as described in greater detail with regard to FIG. 6. Computing system 310 may include internal and external hardware components, as depicted and described in further detail with respect to FIG. 6.

As depicted, computing system 310 includes scheduling module 320. Scheduling module 320 may be an application configured to execute a service scheduling method. For example, scheduling module 320 may be configured to execute the operational steps of service scheduling method 400 as described with respect to FIG. 4. Similarly, scheduling module 320 may be configured to execute the operational steps of deployment method 500 as described with respect to FIG. 5.

As depicted, scheduling module 320 includes compliance checker 330 and resource migration tool 340. It should be appreciated that, while with respect to the depicted embodiment, compliance checker 330 and resource migration tool 340 are depicted as separate entities contained within scheduling module 320, in various other embodiments all three applications may be standalone applications, or may be a single integrated application, or any combination thereof. Compliance checker 330 may be any application configured to detect and identify compliance information corresponding to a cloud environment or a corresponding application. In other words, compliance checker 330 may be configured to determine a set of compliance information to which all applications must adhere. Compliance checker 330 may additional be configured to oversee operations scheduling and execution to ensure that compliance is maintained throughout. In at least some embodiments, compliance checker 330 is configured to update compliance statuses and risk on various resources, such as resources pool 360.

Resource migration tool 340 may be configured to migrate various application components to resources available via resource pool 360. In some embodiments, resource migration tool 340 is equipped to handle application component migration itself; in other embodiments, resource migration tool 340 is merely configured to direct an intermediary application, or the migrating applications themselves, to migrate accordingly.

Database 350 may be configured to store received information and can be representative of one or more databases that give permissioned access to computing system 310 or publicly available databases. In general, database 350 can be implemented using any non-volatile storage media known in the art. For example, database 350 can be implemented with a tape library, optical library, one or more independent hard disk drives, or multiple hard disk drives in a redundant array of independent disk (RAID).

Resources pool 360 refers generally to any combination of resources available via a cloud platform of interest. For example, resources pool 360 may include virtual machines from a traditional cloud environment, nodes from a containerized cloud environment, or any number of additional computing resources available via a cloud platform.

Network 370 can be, for example, a local area network (LAN), a wide area network (WAN) such as the Internet, or a combination of the two, and include wired, wireless, or fiber optics connections. In general, network 370 can be any combination of connections and protocols that will support communications between computing system 310, database 350, and resources pool 360.

Figure 4:
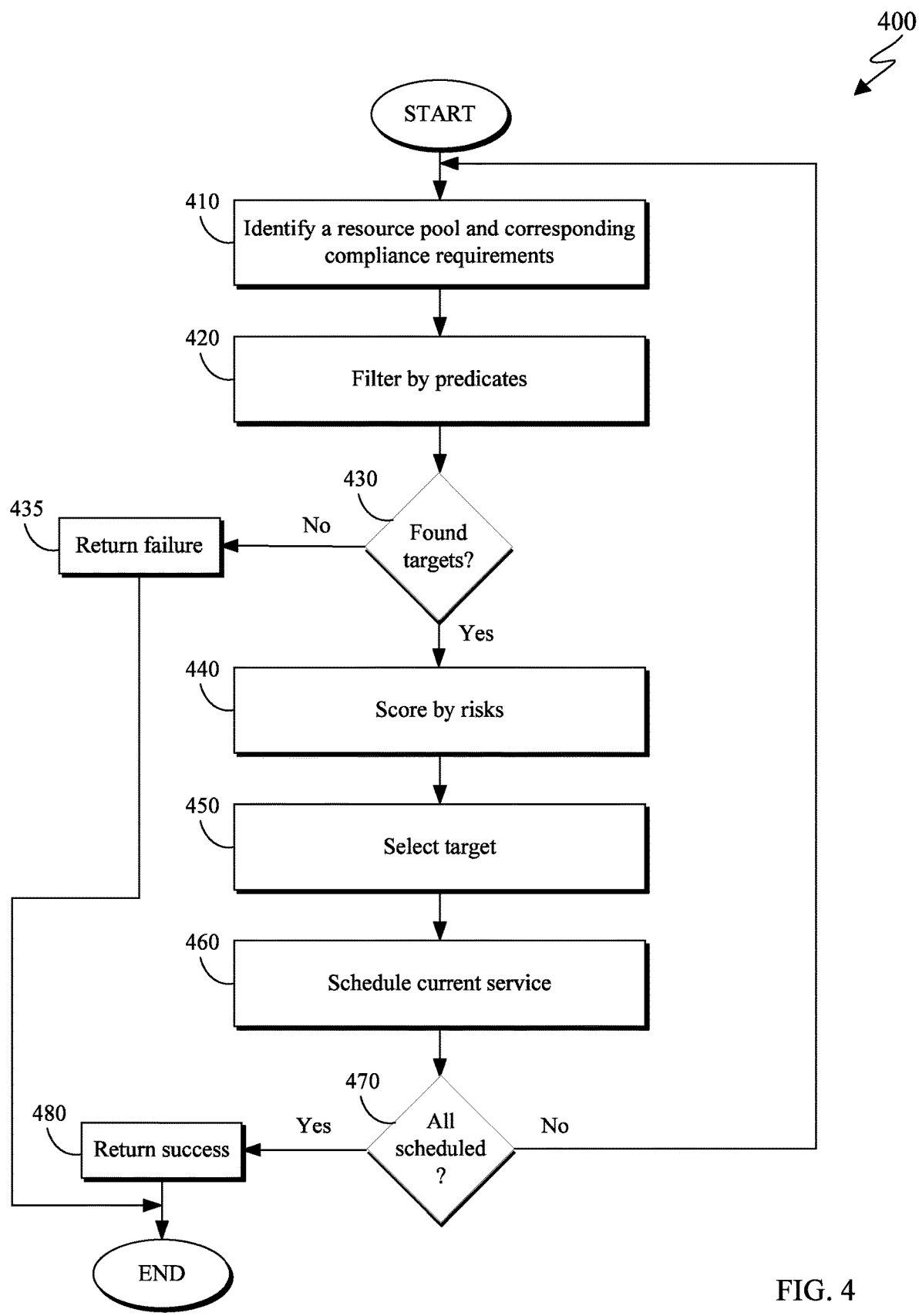
FIG. 4 is a flowchart depicting a service scheduling method in accordance with at least one embodiment of the present invention.

FIG. 4 is a flowchart depicting a service scheduling method 400 in accordance with at least one embodiment of the present invention. As depicted, service scheduling method 400 includes identifying (410) a resource pool and corresponding compliance requirements, filtering (420) by predicates, determining (430) whether target resources are available, returning (435) a failure with respect to a service scheduling attempt, scoring (440) resources in the resource pool by risk, selecting (450) a target resource based on the scored risks, scheduling (460) a current service, determining (470) whether all services are scheduled, and returning (480) a success. Service scheduling method 400 may enable scheduling services while maintaining compliance requirements with respect to service schedule and execution.

Identifying (410) a resource pool and corresponding compliance requirements may include identifying a pool of resources that is available within a subject cloud environment. Identifying (410) a resource pool and corresponding compliance requirements may occur responsive to receiving a service scheduling attempt. Depending on the type of cloud environment with respect to which service scheduling method 400 is executed, the resource pool may correspond to resources distributed amongst hybrid cloud or multiple cloud environments; in other words, the resources may be hosted in a combination of private cloud and public cloud platforms. In at least some embodiments, the resources in the identified resource pool correspond to containers, virtual machines, bare metals, and the like running within the subject cloud environment. Identifying (410) a resource pool may further include identifying a resource pool which has capacity to execute operations to be scheduled. In at least some embodiments, identifying (410) a resource pool and corresponding compliance requirements additionally includes identifying a set of compliant requirements with which service scheduling method 400 is required to comply. For example, when operating within a multi-cloud environment, service scheduling method 400 may be required to comply with different security guidelines laid out by each cloud platform in the multi-cloud environment. In such embodiments, identifying (410) a resource pool and corresponding compliance requirements includes identifying compliance requirements as dictated by the platforms which host the resources of the identified resource pool. In at least some embodiments, compliance requirements correspond to regulated security standards.

Filtering (420) the resource pool by predicates may include determining a compliance status corresponding to the resources of the resource pool. In at least some embodiments, filtering (420) the resource pool includes deploying a process to periodically check compliance rules statuses with respect to each resource in the resource pool based on the identified compliance requirements. In at least some embodiments, filtering (420) the resource pool by predicates may occur in ongoing fashion, such that the filtered list of resources in the resource pool which meet compliance requirements is perpetually updated.

Determining (430) whether target resources are available may include analyzing the identified resource pool to determine whether existing workloads render the target resources unavailable. In at least some embodiments, determining (430) whether target resources are available includes determining resource requirements with respect to a service workload of interest, and subsequently determining whether a combination of resources is available within the resource pool that would facilitate execution of the service workload. Determining (430) whether target resources are available may include accessing an execution schedule with respect to the resources of the resource pool to determine current and future resource availability relative to active service execution as well as scheduled future service execution. If it is determined that resources are indeed available (430, yes branch), the method continues by scoring (440) the resources according to risk. If it is determined that resources are not available (430, no branch), the method continues by returning (435) a failure.

Returning (435) a failure with respect to the service scheduling attempt may include returning an indication that the service scheduling attempt was unsuccessful. In at least some embodiments, returning (435) a failure with respect to the service scheduling attempt includes returning an indication of which resources are unavailable for service execution and subsequently contributing to the returned failure, such that a recipient of the failure indication may analyze current workloads with respect to the indicated resources. In such embodiments, returning (435) a failure with respect to the service scheduling attempt may further include returning an indication of one or more scheduled services preventing the service scheduling attempt from being executed on target resources.

Scoring (440) resources in the resource pool by risk may include analyzing risk levels corresponding to the resources in the resource pool. As used herein, risk refers to a likelihood that a resource's compliance status could change; in other words, risk may refer to the volatility of a resource's status or conditions, and subsequent likelihood to fall out of compliance with the required compliance conditions. In at least some embodiments, scoring (440) resources in the resource pool includes assigning risk to a resource based on domain expert knowledge of said resource and the corresponding compliance. In other embodiments, such as embodiments where historical data is available, scoring (440) resources in the resource pool includes applying a machine learning algorithm to score risk according to the historical data. In yet additional embodiments, domain expert knowledge may be used in tandem with the machine learning algorithm to score resources in the resource pool by risk. In at least some embodiments, application risk is calculated according to the equation:

$$app_{risk}(s, r^*) = avg\left(\sum_{s}^{n} p(s, r^*)\right)$$

Similarly, the minimum application risk may be calculated according to the equation:
constraint:

$$Min(app_{risk}) = min\Sigma\Sigma p(s, r)$$

$$0 \le p \le 10$$

where:

$$\Sigma R(s) > 0 \text{ for all } s \in S$$

$$p(s,r) = avg(w_i \Phi^s(r, w_j) \Psi(r))$$

$0 \le w_i \le 1$ and $0 \le w_j \le 1$ for: s=set of microservices for an app
  R(s)=set of all available resources to deploy microservice s
  p(s,r)=risk score for microservice s deployed on resource r
  $\Phi^s(r)$=risk for resource r selected by microservice s
  $\Psi(r)$ environment risk for resource r
  $w_i$ and $w_j$=weights for resource risk and environment risk, respectively Selecting (450) a target resource based on the scored risks may include identifying a resource or combination of resources capable of executing the service corresponding to the service scheduling attempt which has a most favorable risk score. In other words, selecting (450) a target resource based on the scored risks includes selecting a safest or most stable resource or combination of resources on which to schedule the service. In some embodiments, selecting (450) a target resource based on the scored risks may include ranking all of the scored resources according to said scores such that, in a scenario where a top ranked resource becomes unavailable for some unforeseen reason, the method may continue by selecting the next highest ranked target resource, and so on.

In at least some embodiments, selecting (450) a target resource based on the scored risks additionally includes considering performance and cost when selecting a target resource. In such embodiments, a target resource may be selected by minimizing the following expression:

$$w_r R + w_c \left(\sum_k \sum_{i,j}^k C_{i,j}^{pos} + \sum_k \sum_{i,j}^k C_{i,j}^{rel}\right) + w_p \left(\sum_k \sum_{i,j}^k P_{i,j}^{pos} + \sum_k \sum_{i,j}^k P_{i,j}^{rel}\right)$$

wherein $R = S \circ U^r$ $^k C^{pos} = ^k Q^{c,pos}(S \circ ^k U^{c,pos})$ $^k C^{rel} = ^k Q^{c,rel} \circ (S^k U^{c,rel} S^T)$ $^k P^{pos} = ^k Q^{p,pos}(S \circ ^k U^{p,pos})$, $^k P^{rel} = ^k Q^{p,rel} \circ (S^k U^{p,rel} S^T)$ such that:

$S_{i,j} \subset \{0,1\}$, $U_{i,j}^r \ge 0$, $^k Q_{i,j}^{c,pos} \ge 0$, $^k Q_{i,j}^{c,rel} \ge 0$, $^k Q_{i,j}^{q,pos} \ge 0$, $^k Q_{i,j}^{q,rel} \ge 0$, $^k U_{i,j}^{c,pos} \ge 0$, $^k U_{i,j}^{c,rel} \ge 0$, $^k U_{i,j}^{q,pos} \ge 0$, $^k U_{i,j}^{q,rel} \ge 0$, $w_r \ge 0$, $w_c \ge 0$, $w_p \ge 0$, $w_r + w_c + w_p = 1$ With respect to the above, "m" refers to the number of workloads of an application, "n" refers to a number of hosts, "S" refers to one or more scheduling decisions, "U" refers to risk associated with scheduling decisions, "M" refers to a penalty of a non-compliant scheduling decision, "$U^{c,pos}$" refers to a positional unit cost, "$Q^{c,pos}$" refers to a positional resource quantity, "$U^{c,rel}$" refers to a relational unit cost, "$Q^{c,rel}$" refers to a relational resource quantity, "$U^{p,pos}$" refers to a positional unit performance measurement, "$Q^{p,pos}$" refers to a positional quantity of performance measurement, "$U^{p,rel}$" refers to a relational unit performance measurement, and "$Q^{p,rel}$" refers to a relational quantity of performance measurement, and "$w_r$", "$w_c$", and "$w_p$" are weight parameters corresponding to risk, cost, and performance respectively that allow the user to tune the deployment of the workload according to the corresponding factors.

Scheduling (460) a current service may include identifying an available time slot for service executing with respect to the selected target resource. In at least some embodiments, scheduling (460) a current service additionally includes deploying microservices to a resource such that application risk is minimized and the application is compliant based on the compliance requirements. Scheduling (460) a current service may additionally ultimately include executing the current service at the scheduled time.

Determining (470) whether all services are scheduled may include determining whether additional service scheduling attempts exist within the system. If it is determined that all services are indeed scheduled (470, yes branch), the method continues by returning (480) a success. If it is determined that all services are not scheduled (470, no branch), the method continues by returning to identifying (410) a resource pool and corresponding compliance requirements.

Returning (480) a success with respect to the service scheduling attempt may include returning an indication that the service scheduling attempt was successful. In at least some embodiments, returning (480) a success with respect to the service scheduling attempt includes returning an indication of which resources were ultimately utilized to fulfill the service scheduling attempt.

Figure 5:
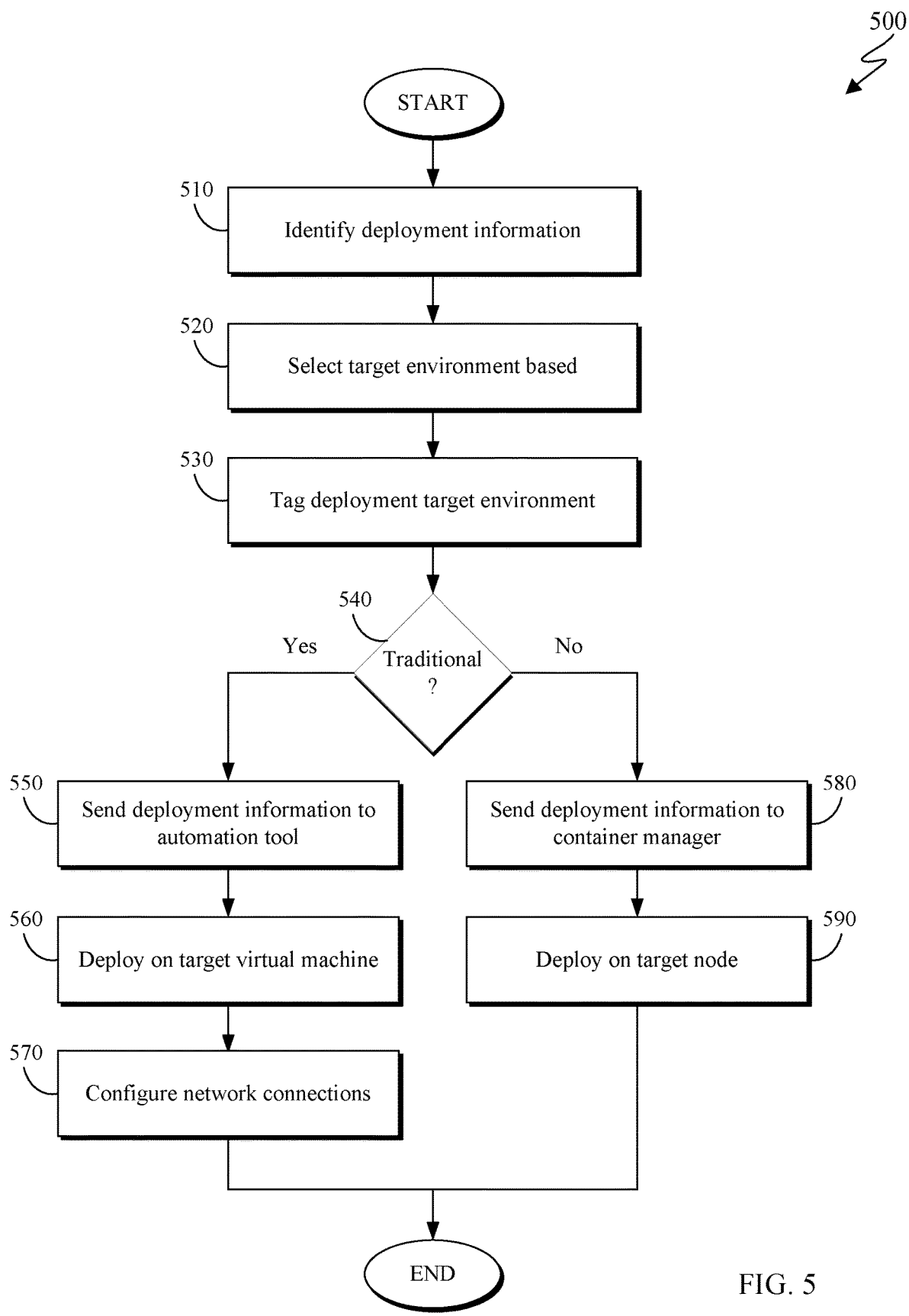
FIG. 5 is a flowchart depicting a deployment method in accordance with at least one embodiment of the present invention.

FIG. 5 is a flowchart depicting a deployment method 500 in accordance with at least one embodiment of the present invention. As depicted, deployment method 500 includes identifying (510) deployment information, selecting (520) a target environment, tagging (530) the target deployment environment, determining (540) whether the target environment corresponds to a traditional environment, sending (550) deployment information to an automation tool, deploying (560) the application on a target virtual machine, configuring (570) network connections, sending (580) deployment information to a container manager, and deploying (590) the application on a target node. Deployment method 500 may enable services to be deployed at an appropriate target location according to risk analysis.

Identifying (510) deployment information may include identifying a service scheduling request corresponding to a deployment of a service or an application. In at least some embodiments, identifying (510) deployment information includes identifying timeframe constraints corresponding to the service scheduling request.

Selecting (520) a target environment may include analyzing risk levels present with respect to available environments. In at least some embodiments, selecting (520) a target environment includes leveraging previously identified risk levels or risk scores to identify and select an environment with the least corresponding risk. Appropriate methods for analyzing risk with respect to target environments are described with respect to step 440 of service scheduling method 400 described with respect to FIG. 4.

Tagging (530) the target deployment environment may include applying a tag to the selected target environment. As described above, the target deployment environment may correspond to a target environment with a lowest risk level or score.

Determining (540) whether the target environment corresponds to a traditional environment may include analyzing the target environment to determine whether its structure adheres to a traditional cloud environment structure. If it is determined that the target environment indeed corresponds to a traditional cloud environment (540, yes branch), the method continues by sending (550) deployment information to an automation tool. If it is determined that the target environment does not correspond to a traditional cloud environment (540, no branch), and rather corresponds to an alternative environment such as a container environment, the method continues by sending (580) deployment information to a container manager.

Sending (550) deployment information to an automation tool may include sending an indication to an automation tool responsible for managing service deployments with respect to a traditional cloud environment. In at least one embodiment, sending (550) deployment information to an automation tool includes providing said automation tool with execution instructions along with scheduling information for deployment of a service or application. In at least one embodiment, sending (550) deployment information to an automation tool refers generally to sending deployment information to a default scheduler used to manage container resources in a single cluster.

Deploying (560) the service on a target virtual machine may include deploying one or more microservices corresponding to an application or service of interest. The target virtual machine may correspond to a virtual machine through which identified target resources are available. In at least some embodiments, deploying (560) the service on a target virtual machine includes deploying the service according to the corresponding scheduling information.

Configuring (570) network connections may include verifying that existing network connections are capable of supporting transmission of deployment information and subsequent microservice execution. In at least some embodiments, configuring (570) network connections includes providing an indication of one or more existing network connections which have been deemed inadequate for necessary transmission. Configuring (570) network connections may additionally include identifying one or more supplemental connections which may facilitate communication between the necessary resources.

Sending (580) deployment information to a container manager may include providing a container manager with information indicating a service or set of microservices which are to be deployed on a set of indicated resources. In at least some embodiments, sending (580) deployment information to a container manager includes sending scheduling information corresponding to the service or microservices to be deployed, wherein the scheduling information indicates scheduling limitations or constraints.

Deploying (590) the application on a target node may include subsequently deploying services or microservices on the target node as determined by the preceding steps. The target node may correspond to a node which houses the target resource or resources. In at least some embodiments, deploying (590) the application on a target node includes deploying the services or microservices according to the scheduling information corresponding to the services.

Figure 6:
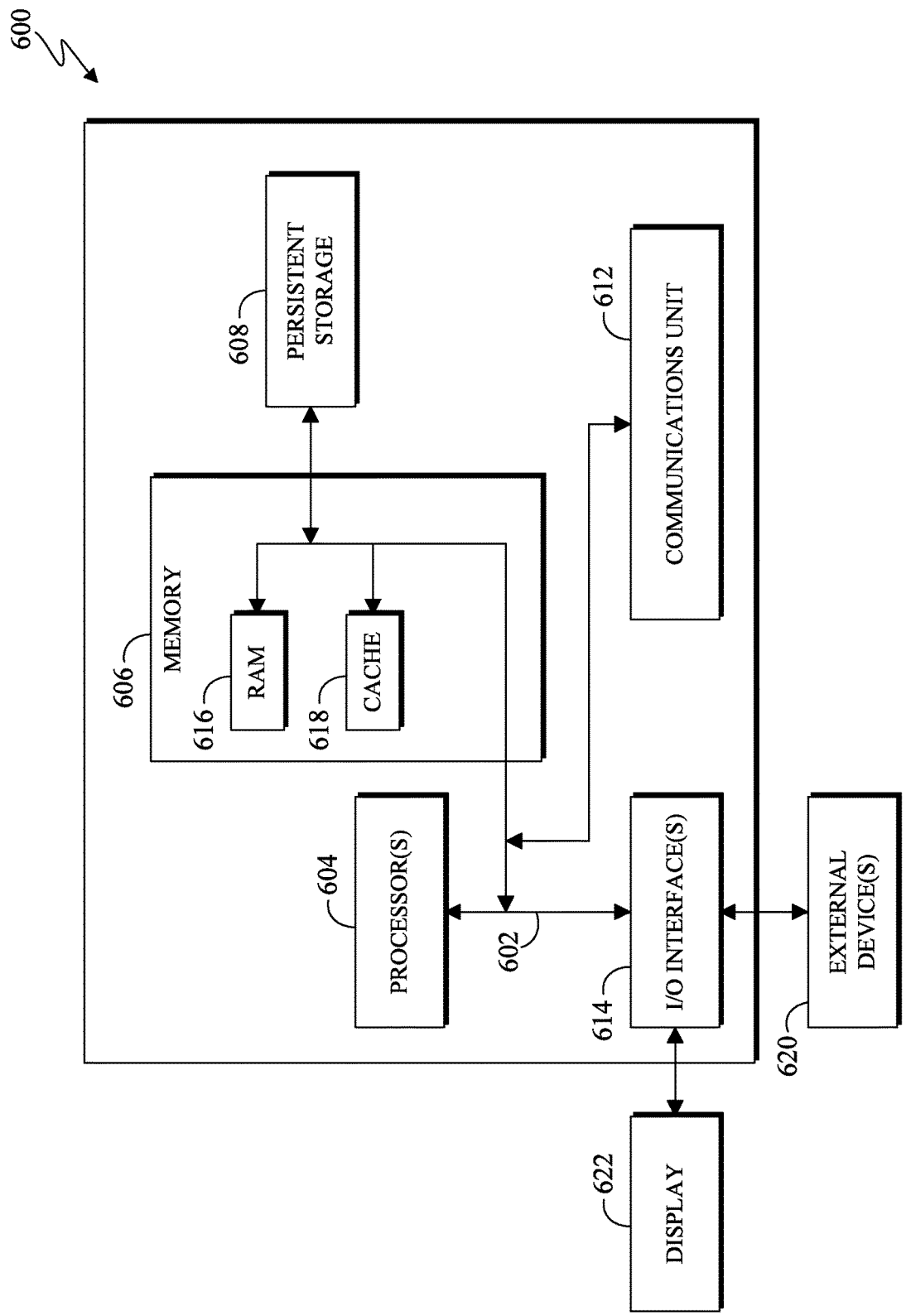
FIG. 6 is a block diagram of components of a computing system in accordance with an embodiment of the present invention.

FIG. 6 depicts a block diagram of components of computing system 310 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for scheduling services in a computing environment, the computer implemented method comprising:
   receiving a service scheduling request corresponding to the computing environment;
   identifying a resource pool and a set of compliance requirements corresponding to security standards of the computing environment;
   identifying target resources within the resource pool, wherein target resources are resources which meet the set of compliance requirements;
   identifying a set of available target resources, wherein available target resources are target resources with scheduling availability;
   analyzing the set of available target resources to determine a risk score for each available target resource, wherein the risk score indicates volatility of a target resource's compliance status;
   selecting one or more of the set of available target resources according to the determined risk scores; and
   scheduling a service corresponding to the service scheduling request on the selected one or more available target resources.

2. The computer implemented method of claim 1, wherein selecting one or more of the set of available target resources includes selecting the available resource or resources with a lowest risk score.

3. The computer implemented method of claim 1, wherein analyzing the set of available target resources to determine a risk score for each available target resource includes calculating risk according to risk factors present within the available target resource itself.

4. The computer implemented method of claim 1, wherein analyzing the set of available target resources to determine a risk score for each available target resource includes calculating risk according to risk factors present in an environment in which the available target resource resides.

5. The computer implemented method of claim 1, further comprising:
   analyzing the set of available target resources to determine a performance score for each available target resource; and
   selecting one or more of the set of available target resources according to the determined risk scores and the determined performance scores.

6. The computer implemented method of claim 1, further comprising:
   analyzing the set of available target resources to determine a cost score for each available target resource; and
   selecting one or more of the set of available target resources according to the determined risk scores and the determined cost scores.

7. The computer implemented method of claim 1, wherein identifying target resources within the resource pool is executed recursively, such that the identified target resources remain accurate based on current states of the identified target resources.

8. A computer program product for scheduling services in a computing environment, the computer program product comprising:
one or more computer readable storage media and program instructions stored on the one or more computer readable storage media, the program instructions comprising instructions to:
receive a service scheduling request corresponding to the computing environment;
identify a resource pool and a set of compliance requirements corresponding to security standards of the computing environment;
identify target resources within the resource pool, wherein target resources are resources which meet the set of compliance requirements;
identify a set of available target resources, wherein available target resources are target resources with scheduling availability;
analyze the set of available target resources to determine a risk score for each available target resource, wherein the risk score indicates volatility of a target resource's compliance status;
select one or more of the set of available target resources according to the determined risk scores; and
schedule a service corresponding to the service scheduling request on the selected one or more available target resources.

9. The computer program product of claim 8, wherein instructions to select one or more of the set of available target resources comprise instructions to select the available resource or resources with a lowest risk score.

10. The computer program product of claim 8, wherein instructions to analyze the set of available target resources to determine a risk score for each available target resource include instructions to calculate risk according to risk factors present within the available target resource itself.

11. The computer program product of claim 8, wherein instructions to analyze the set of available target resources to determine a risk score for each available target resource include instructions to calculating risk according to risk factors present in an environment in which the available target resource resides.

12. The computer program product of claim 8, further comprising instructions to:
analyze the set of available target resources to determine a performance score for each available target resource; and
select one or more of the set of available target resources according to the determined risk scores and the determined performance scores.

13. The computer program product of claim 8, further comprising instructions to:
analyze the set of available target resources to determine a cost score for each available target resource; and
select one or more of the set of available target resources according to the determined risk scores and the determined cost scores.

14. The computer program product of claim 8, wherein identifying target resources within the resource pool is executed recursively, such that the identified target resources remain accurate based on current states of the identified target resources.

15. A computer system for scheduling services in a computing environment, the computer system comprising:
one or more computer processors;
one or more computer-readable storage media;
program instructions stored on the computer-readable storage media for execution by at least one of the one or more processors, the program instructions comprising instructions to:
receive a service scheduling request corresponding to the computing environment;
identify a resource pool and a set of compliance requirements corresponding to security standards of the computing environment;
identify target resources within the resource pool, wherein target resources are resources which meet the set of compliance requirements;
identify a set of available target resources, wherein available target resources are target resources with scheduling availability;
analyze the set of available target resources to determine a risk score for each available target resource, wherein the risk score indicates volatility of a target resource's compliance status;
select one or more of the set of available target resources according to the determined risk scores; and
schedule a service corresponding to the service scheduling request on the selected one or more available target resources.

16. The computer system of claim 15, wherein instructions to select one or more of the set of available target resources comprise instructions to select the available resource or resources with a lowest risk score.

17. The computer system of claim 15, wherein instructions to analyze the set of available target resources to determine a risk score for each available target resource include instructions to calculate risk according to risk factors present within the available target resource itself.

18. The computer system of claim 15, wherein instructions to analyze the set of available target resources to determine a risk score for each available target resource include instructions to calculating risk according to risk factors present in an environment in which the available target resource resides.

19. The computer system of claim 15, further comprising instructions to:
analyze the set of available target resources to determine a performance score for each available target resource; and
select one or more of the set of available target resources according to the determined risk scores and the determined performance scores.

20. The computer system of claim 15, further comprising instructions to:
analyze the set of available target resources to determine a cost score for each available target resource; and
select one or more of the set of available target resources according to the determined risk scores and the determined cost scores.

* * * * *